3,353,745
POPPET VALVE THERMOSTAT COMPENSATED
AS TO PRESSURE
Paul K. Beatenbough, Medina, N.Y., assignor to General
Motors Corporation, Detroit, Mich., a corporation of
Delaware
Filed Nov. 12, 1965, Ser. No. 507,393
7 Claims. (Cl. 236—34)

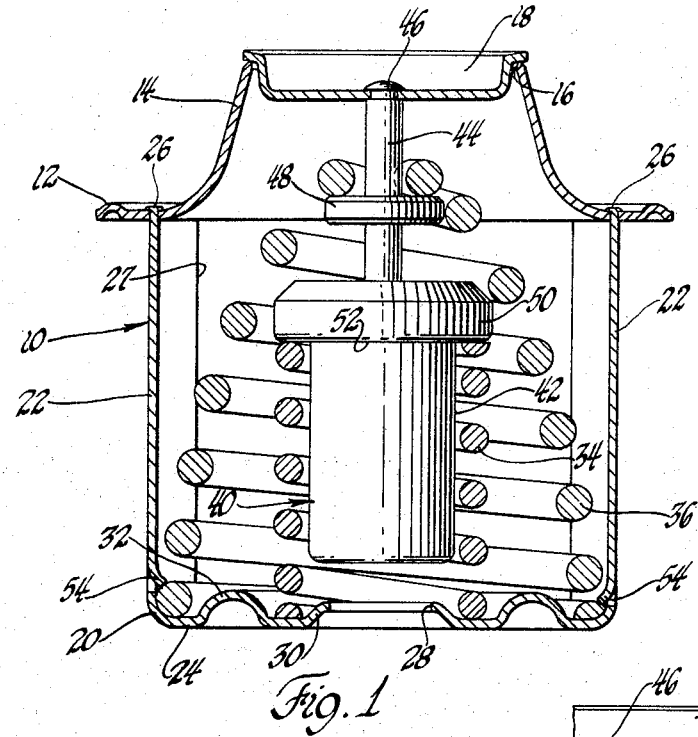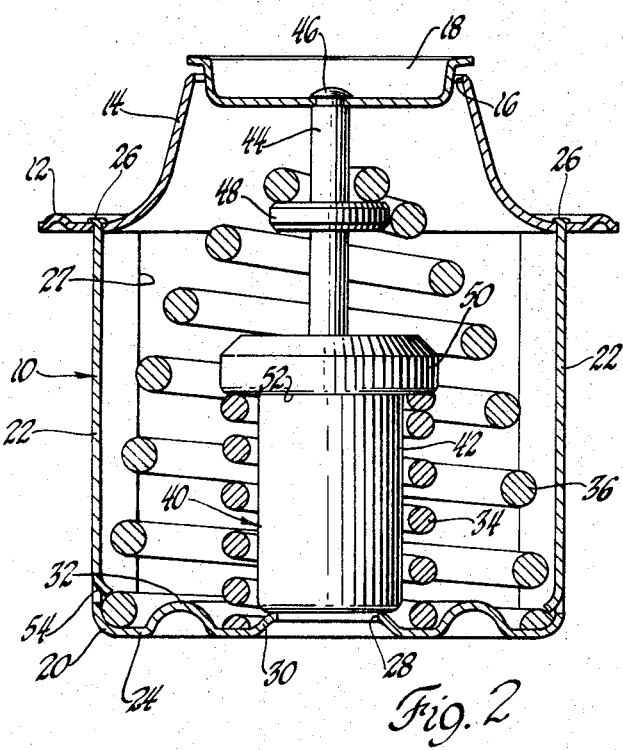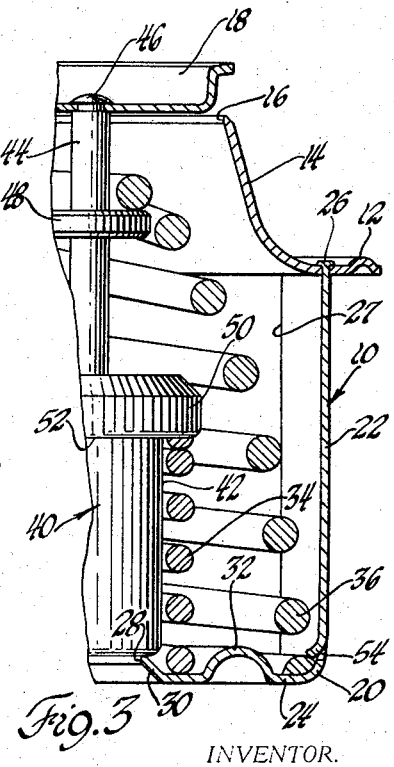

ABSTRACT OF THE DISCLOSURE

A single valve thermostat assembly for controlling coolant flow from an internal combustion engine to a radiator.

Specification

This invention relates to thermostats and more particularly to a thermostat having a valve operated by a temperature sensitive pellet type motor effective to change the start-to-open temperature when fluid pressure exerted on the valve changes.

When temperature of an engine coolant determines the start-to-open temperature of a thermostat controlling engine coolant flow to a radiator, sudden increases of engine speed are accompanied by surges of coolant pressure but thermostatic valves as heretofore used in this field do not compensate for this situation.

An object of the present invention is to provide a thermostat for improving automobile engine performance and also to realize a minimum passenger compartment warm-up time when an engine coolant type heater is used.

A feature of the invention is a thermostat having a single valve seat and which is actuated by a temperature sensitive pellet type motor supported by two springs in such a way that the higher the coolant pump pressure the lower will be the start-to-open temperature of the valve.

These and other objects and features of the invention will become apparent as the description proceeds.

In the drawings:

FIG. 1 shows a view in cross section of a thermostat valve assembly in which the present invention is embodied, the valve being closed;

FIG. 2 is a view similar to that of FIGURE 1 but with the valve in start-to-open position; and FIG. 3 is a view similar to one-half of FIGURE 1 but with the valve fully open.

The thermostat valve assembly 10 includes a circular flange 12 for supporting the assembly in a conduit or connection between an engine cooling jacket and a radiator. Integral with that flange is a frusto-conical throat portion 14 with a discharge opening 16 adapted to be closed by a poppet valve or disc 18. A bracket 20 having two legs 22 and a circular bottom or plate 24 is fixed, as by swaging 26, to the flange 12. The legs separate large and opposite side openings such as the opening 27 through which engine coolant may enter the thermostat assembly because of conventional pump action. Entrance may be facilitated at times by an opening 28 made in the frame bottom 24. The latter is formed with upstanding and concentric ridges 30 and 32 aiding in coaxially retaining the lower ends of two coil springs 34 and 36. The spring 34 may be called a "compensating" spring or the "second spring means" whereas the spring 36 may be termed a "main spring" or "first spring means" as will further appear.

A pellet motor 40, which is somewhat of the type disclosed in the Drapeau patent above mentioned, is utilized. This motor comprises a casing 42 enclosing a temperature sensitive wax and a plunger 44, the latter being extendable from the casing 42 when the wax is heated and consequently expands. The upper end of the plunger 44 is fixed as at 46 to the valve 18. A ledge 48 is formed on an intermediate part of the exposed portion of the plunger 44. The casing 42 has an annular top 50 through which the plunger 44 slidably protrudes and this top 50 has a downwardly facing annular shoulder 52. Tabs 54 on the legs 22 retain the bottom loop of the first spring means or spring 36 against the frame bottom 24. The top loop of the spring 36 is constrained in its position by the ledge 48 as that spring is under tension at all times. The second spring means or spring 34 is held under compression between the frame bottom 24 and the shoulder 52 so that, when the thermostat valve assembly is cold and the valve 18 closed the bottom of the pellet motor casing 42 will be suspended a slight distance above the ridge 30 of the bracket 20 as seen in FIGURE 1.

Assume that an automobile engine designer specifies 180° Fahrenheit as a maximum thermostat control temperature of an automobile engine coolant at 80 miles per hour vehicle speed. At 80 miles per hour an conventional installation of an engine coolant heater using engine coolant as a heating medium for ventilation air would possibly result in an air discharge temperature for the heater of about 140° Fahrenheit for introduction into the passenger compartment. If it were possible to cause the thermostat to control a constant 180° Fahrenheit over the vehicle speed range, the heater air discharge temperature at 20 miles per hour may well be only 130° Fahrenheit and at engine idle may be even lower. From this, it may be seen that when using conventional thermostat valves as heretofore and an engine designer specifies 180° Fahrenheit control temperature at 80 miles per hour, he has been thinking in terms of such things as engine metal temperature and fuel mixture temperature. These temperatures are dependent not only on coolant temperature but also on the rate of heat flow from the combustion gases to the coolant. Therefore, at a lower car speed when the rate of heat flow is reduced, a coolant temperature higher than heretofore realized is desirable within the same metal and fuel mixture temperature limitations which establish the 180° Fahrenheit temperature at 80 miles per hour criteria. The present invention contributes a means of increasing the heater air discharge air temperature at low car speeds without increasing the metal and fuel mxture temperatures at high car speeds.

With the present invention and during an engine warm-up period with no substantial pump pressure acting on the valve 18, the power element or motor 40 will begin to act and will compress the inner or compensating spring 34 until sufficient resistance is developed to cause the outer or main spring 36 to start to move or extend from its condition as shown in FIGURE 1 to that of FIGURE 2. Therefore, the initial travel of the power element or motor 40 in its power stroke will be expended in compressing the compensating spring 34 rather than in opening the valve. From this, it may be seen that the start-to-open temperature of the valve 18 will be higher than the start-to-travel temperature of the power element or motor 40.

With pump pressure acting on the underside of the valve 18, less force from the motor 40 is required to open the valve 18 than would be required if the spring 34 urged the valve to close. For this reason, the motor 40 is not required to compress the spring 34 as far and the start-to-open temperature of the valve is lower despite the fact that the start-to-travel temperature of the power element is maintained the same.

As the pump pressure effect on the valve 18 increases still further, the start-to-open temperature of the valve 18 is reduced further (because of the coolant flow) and approaches the start-to-travel temperature of the power element. At this point, if the pump pressure is increased again as by an increase in vehicle or motor speed or for some other reason, the valve 18 will blow open without regard to the power element 40 temperature and is illustrated in FIGURE 3.

In a customary or ordinary installation of the assembly 10, the design parameters are selected to place the blow open point above the desired operating speed range. However, the blow open feature is very desirable to limit cooling system pressures during high engine speed operation at transmission shift points. Excessive cooling system pressure in automobiles places undue strain upon radiator and heater core structures.

It will be noted that in the particular embodiment disclosed, there is no need for lateral restraining or frictional guidance of the pellet motor 40. It should be appreciated, however, that at low driving speeds or at idle, when there is little or no pump pressure, the casing 42 preferably will bottom on the bracket 20 before the valve 18 starts to open.

I claim:

1. A thermostat valve assembly comprising a supporting flange element having a valve seat defining a discharge port for a fluid, a bracket fixed to said flange element and presenting an open structure defining an inlet for said fluid and including a plate spaced from said flange element, a valve arranged to seat on said valve seat on one side of said discharge port, a thermo-sensitive motor arranged on the other side of said discharge port and having telescopically arranged parts adaptable cooperatively to develop a force upon an increase in temperature, one of said parts being fixed to said valve to apply said force to the latter and the other being located between said supporting flange and said plate and movable to and from the latter first spring means urging said valve and said one of said motor parts against said force and toward said plate to close said discharge port, and second spring means being in compression between said other motor part and said plate urging both of the said motor parts and the said valve away from said plate.

2. A thermostatic valve assembly such as described in claim 1, the said valve being a poppet type valve and the said valve seat being the sole valve seat in the assembly.

3. A thermostatic valve assembly such as described in claim 1, said first spring means being a coil spring under tension, and said second spring means being a coil spring under compression and coaxial with said first spring means.

4. A thermostatic valve assembly such as described in claim 1, said bracket comprising legs rigidly connecting said flange element to said plate, and said thermo-sensitive motor being within the confines of said flange element, legs and plate and clear of said bracket when said valve is in its closed position.

5. A thermostatic valve assembly such as described in claim 1, one of said motor parts being a plunger joined to said valve, and the other of said motor parts being a casing with a closed end adapted to contact said plate when said second spring means yields to said force and to move away from said plate when said discharge port is closed by said valve.

6. A thermostatic valve assembly such as described in claim 1, the ratings of said spring means being such that said valve will open when the exterior of said motor is subjected to a pressure of said fluid in excess of a predetermined pressure.

7. A thermostatic valve assembly such as described in claim 1, the said valve being a poppet type valve and the sole valve in the assembly, the said first spring means being a coil spring under tension, the said second spring means being a coil spring under compression, the said motor parts, springs and valve being coaxial, and the ratings of said springs being such that upon a predetermined increase of temperature said other of said motor parts will abut said plate before said valve will open said discharge port.

References Cited

UNITED STATES PATENTS

| 2,237,732 | 4/1941 | Giesler | 263—34 |
| 3,017,113 | 1/1962 | Drapeau | 236—34 |
| 3,096,022 | 7/1963 | Holley | 236—34.5 |
| 3,182,911 | 5/1965 | Drapeau | 236—34 |

FOREIGN PATENTS

| 903,769 | 8/1962 | Great Britain. |
| 1,087,406 | 8/1960 | Germany. |

EDWARD J. MICHAEL, *Primary Examiner.*